(12) United States Patent
Kim

(10) Patent No.: US 7,729,225 B2
(45) Date of Patent: Jun. 1, 2010

(54) OPTICAL INFORMATION PROCESSING APPARATUS, OPTICAL INFORMATION RECORDING METHOD, OPTICAL INFORMATION REPRODUCING METHOD AND OPTICAL INFORMATION SERVO CONTROLLING METHOD

(75) Inventor: Nak-Young Kim, Seoul (KR)

(73) Assignee: Daewoo Electronics Corp., Seoul (KR)

( * ) Notice: Subject to any disclaimer, the term of this patent is extended or adjusted under 35 U.S.C. 154(b) by 529 days.

(21) Appl. No.: 11/688,466

(22) Filed: Mar. 20, 2007

(65) Prior Publication Data
US 2007/0247683 A1    Oct. 25, 2007

(30) Foreign Application Priority Data
Apr. 25, 2006  (KR) .................. 10-2006-0037386
Sep. 25, 2006  (KR) .................. 10-2006-0092891

(51) Int. Cl.
*G11B 7/00* (2006.01)
(52) U.S. Cl. .............. 369/103; 369/112.17; 369/124.02
(58) Field of Classification Search ................ 369/103, 369/112.01, 112.17, 124.02
See application file for complete search history.

(56) References Cited

U.S. PATENT DOCUMENTS

| | | | | |
|---|---|---|---|---|
| 6,061,154 A * | 5/2000 | Campbell et al. | ............ | 359/32 |
| 6,614,566 B1 * | 9/2003 | Curtis et al. | ............ | 359/24 |
| 6,944,110 B2 * | 9/2005 | Gladney et al. | ............ | 369/103 |
| 7,092,133 B2 * | 8/2006 | Anderson et al. | ............ | 359/25 |
| 7,362,687 B2 * | 4/2008 | Tsukagoshi | ............ | 369/103 |
| 7,496,024 B2 * | 2/2009 | Kihara et al. | ............ | 369/103 |
| 7,515,521 B2 * | 4/2009 | Uno et al. | ............ | 369/103 |
| 2005/0179967 A1 | 8/2005 | Ogasawara | | |

FOREIGN PATENT DOCUMENTS

| | | |
|---|---|---|
| EP | 1 507 178 A1 | 2/2005 |
| EP | 1 526 517 A2 | 4/2005 |
| EP | 1 675 108 A1 | 6/2006 |
| EP | 1 708 181 A3 | 2/2007 |
| WO | 2005-029476 A1 | 3/2005 |

OTHER PUBLICATIONS

European Search Report dated Dec. 28, 2007.

* cited by examiner

*Primary Examiner*—Wayne R Young
*Assistant Examiner*—Brenda Bernardi
(74) *Attorney, Agent, or Firm*—Revolution IP, PLLC

(57) ABSTRACT

An optical information processing apparatus is provided. The optical information processing apparatus includes: an optical system which irradiates a reference beam on an optical information recording medium having a plurality of recording regions adjacent to each other so that the reference beam is wider than each of the recording regions; a filter which filters readout beams reproduced from the optical information recording medium to pass a selected readout beam reproduced from a selected recording region and separates neighborhood readout beams reproduced from neighborhood of the selected recording regions; a readout beam detector which detects the selected readout beam passing through the filter; a neighborhood readout beam detector which detects the neighborhood readout beams separated by the filter; and a controller which compares the neighborhood readout beams detected by the neighborhood readout beam detector to control a reproduction condition of the selected readout beam.

21 Claims, 10 Drawing Sheets

[FIG. 1]
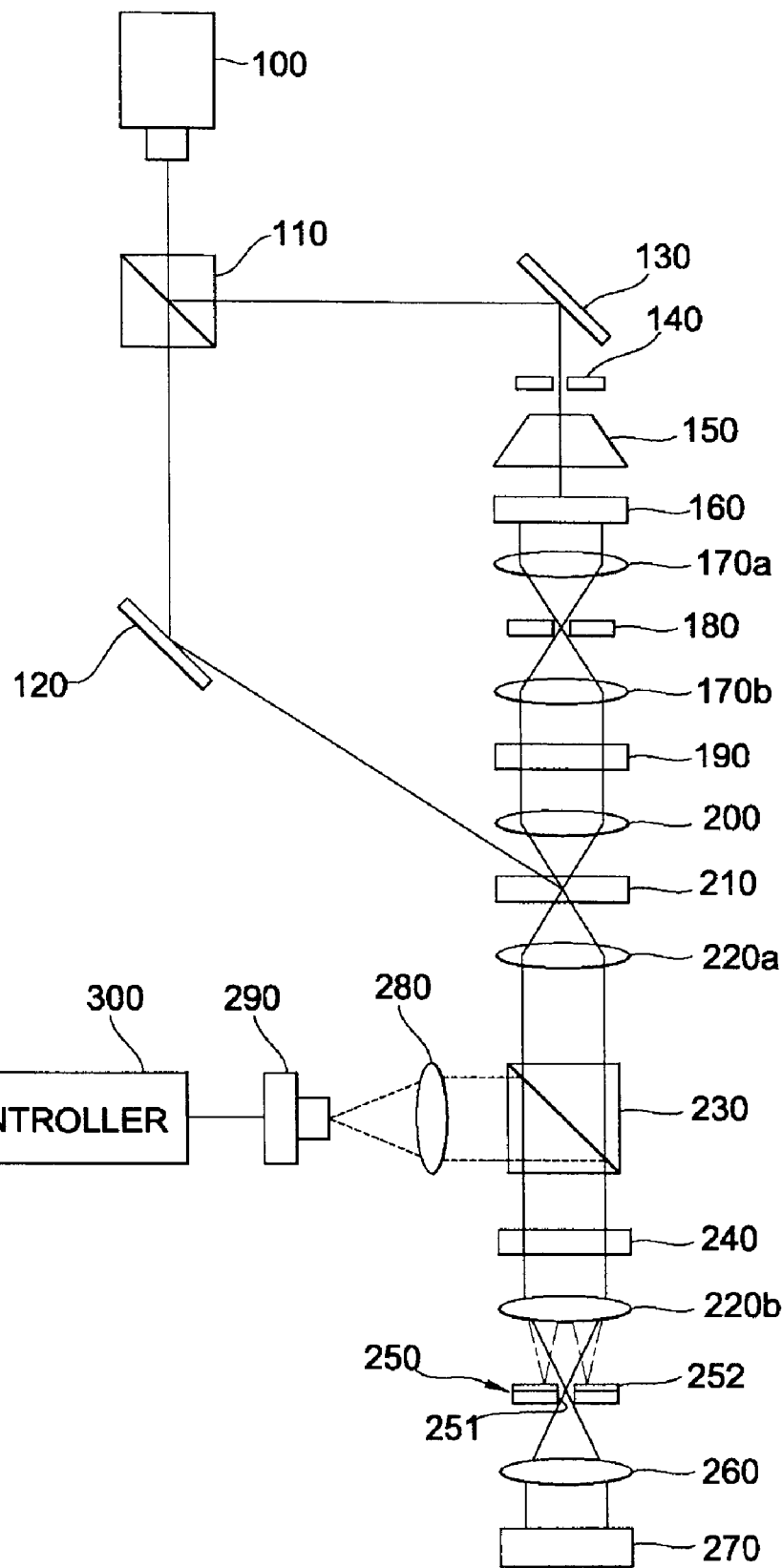

[FIG. 2]
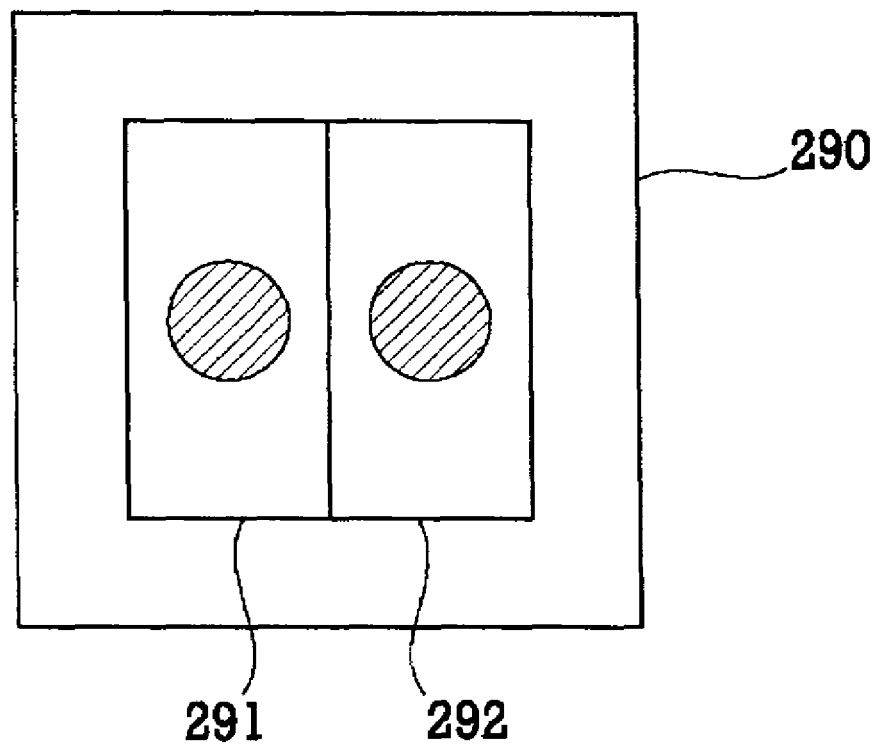

[FIG. 3]
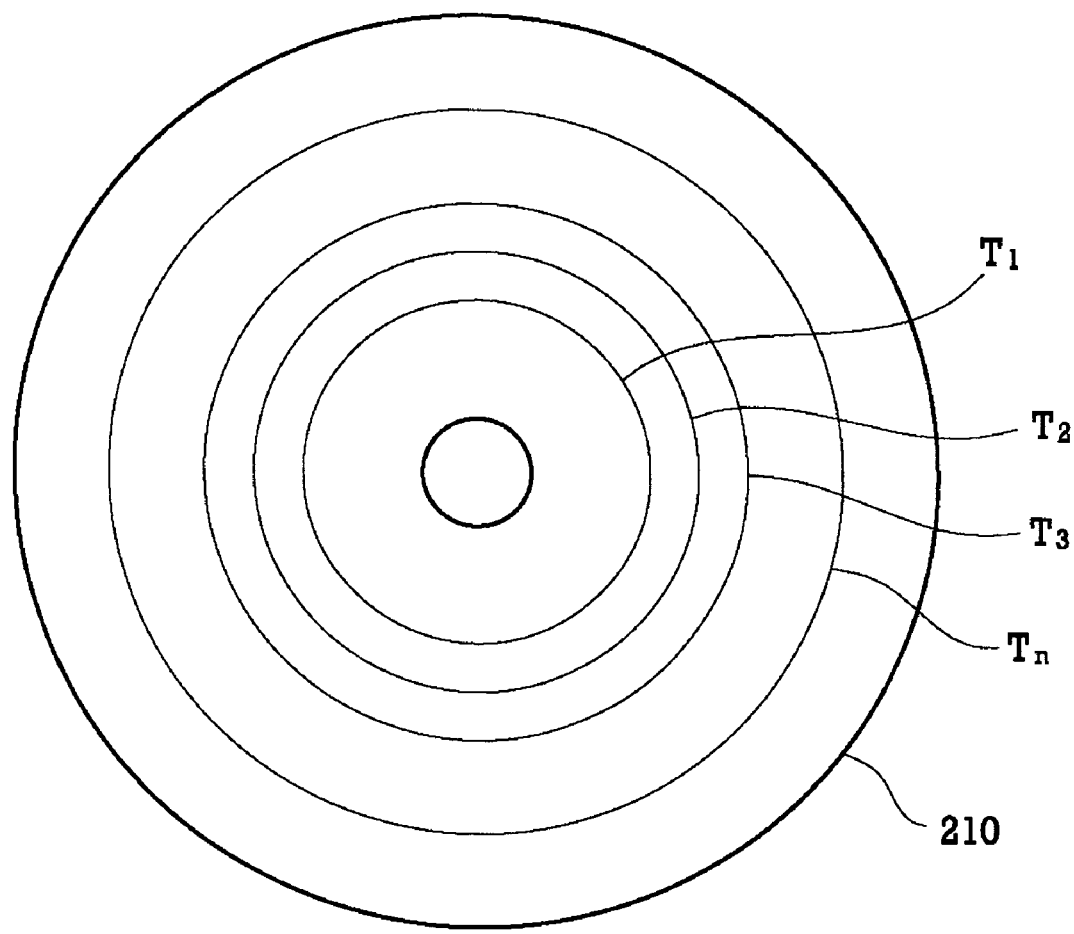

[FIG. 4]
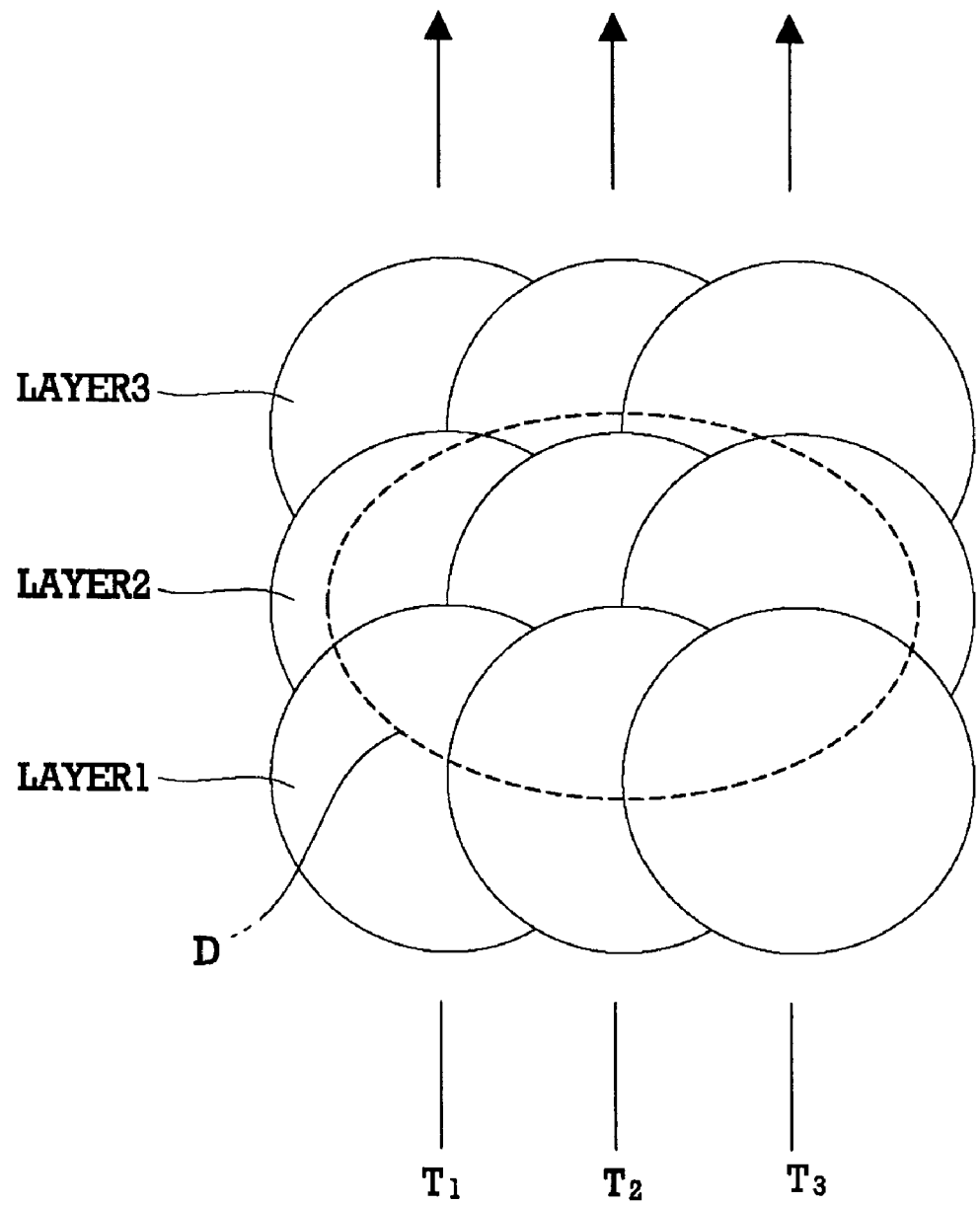

[FIG. 5]
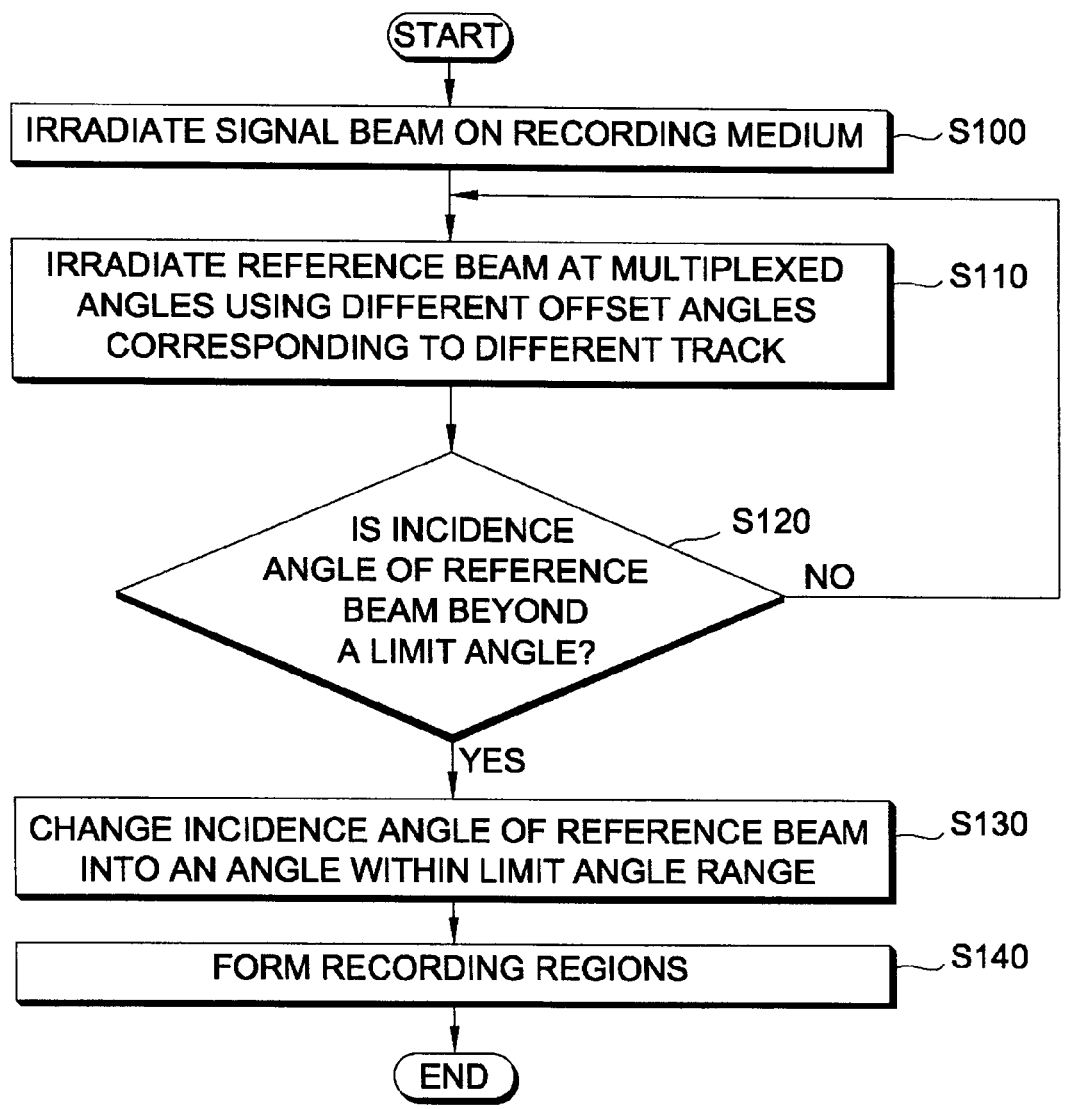

[FIG. 6A]
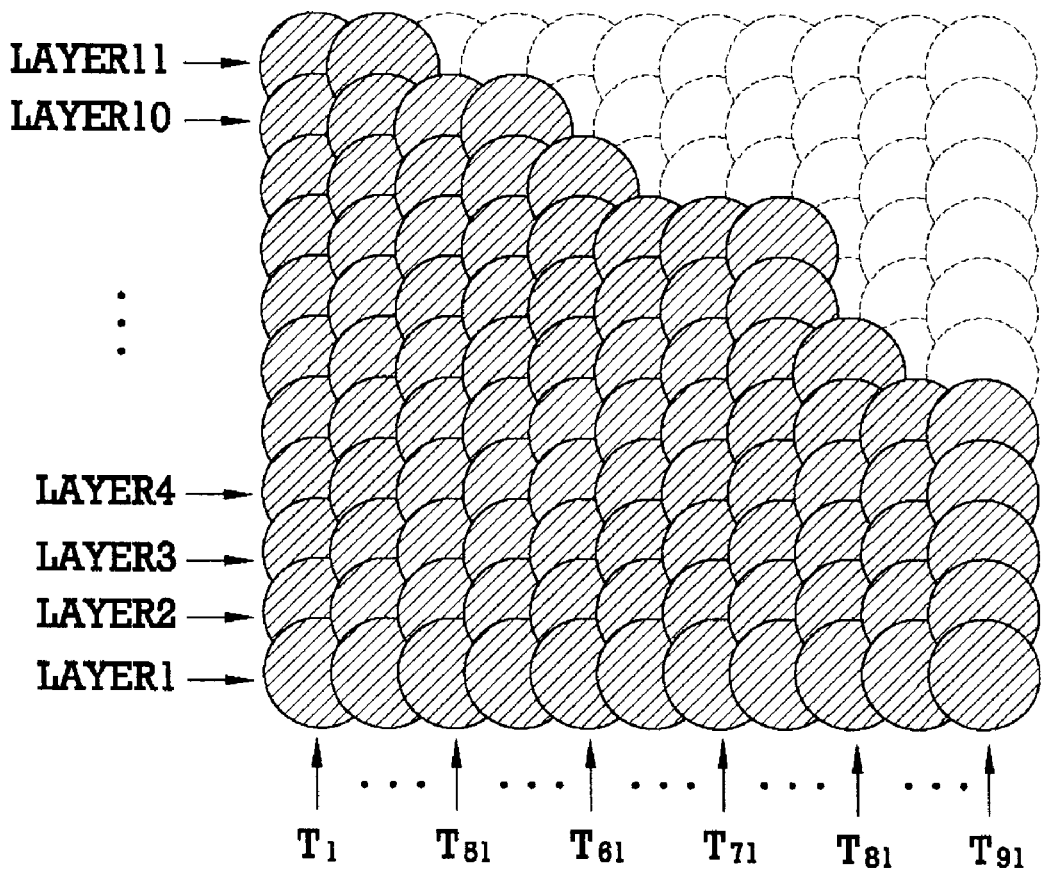

[FIG. 6B]
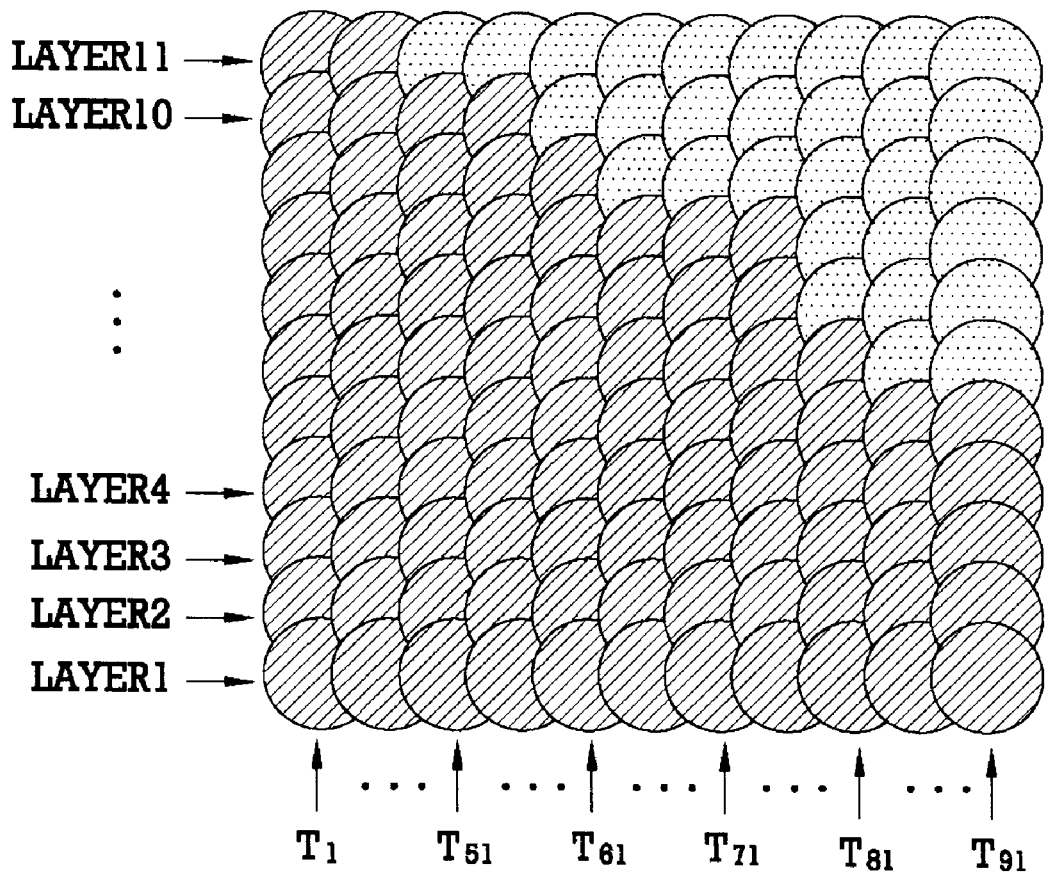

[FIG. 7]
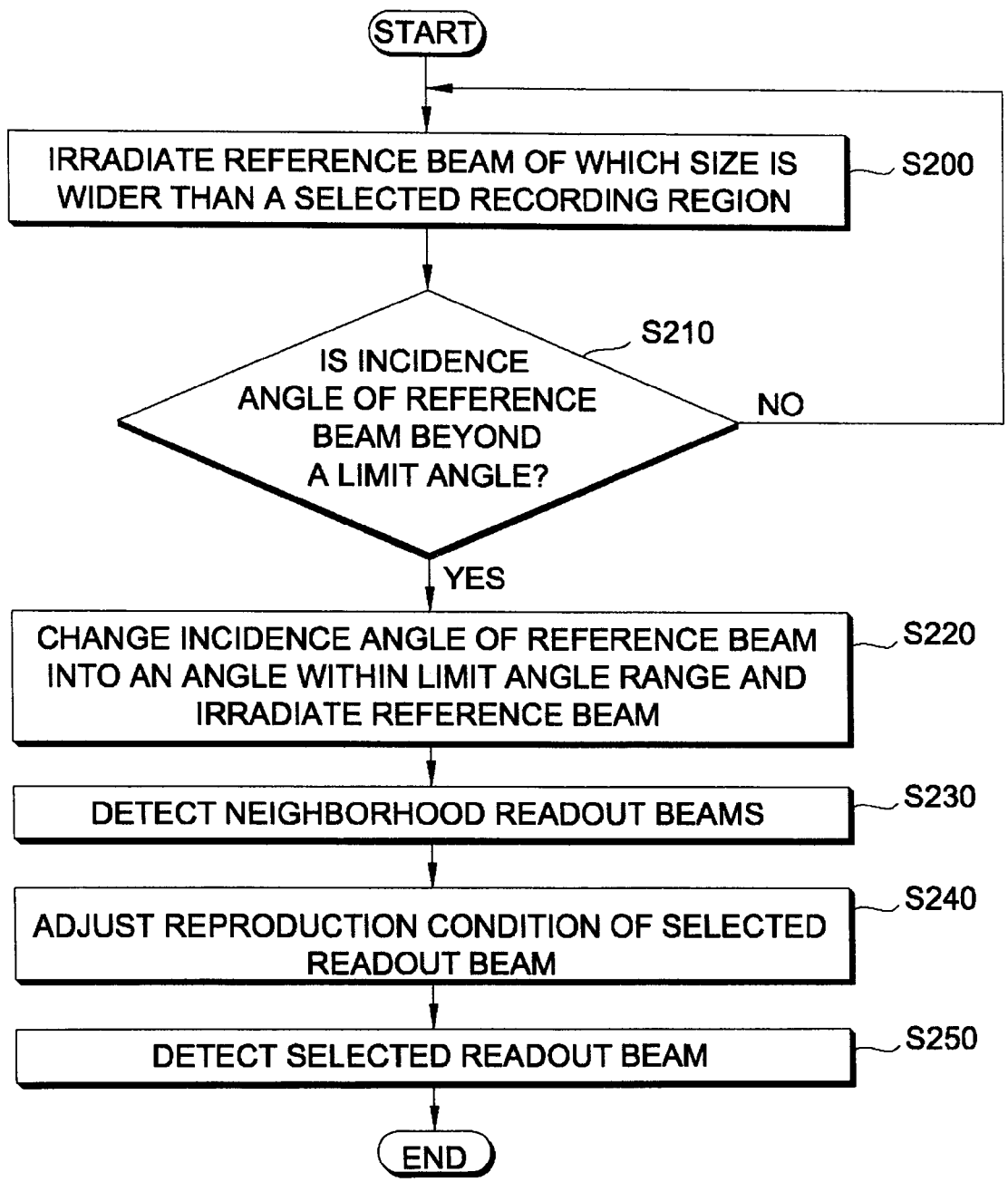

[FIG. 8]
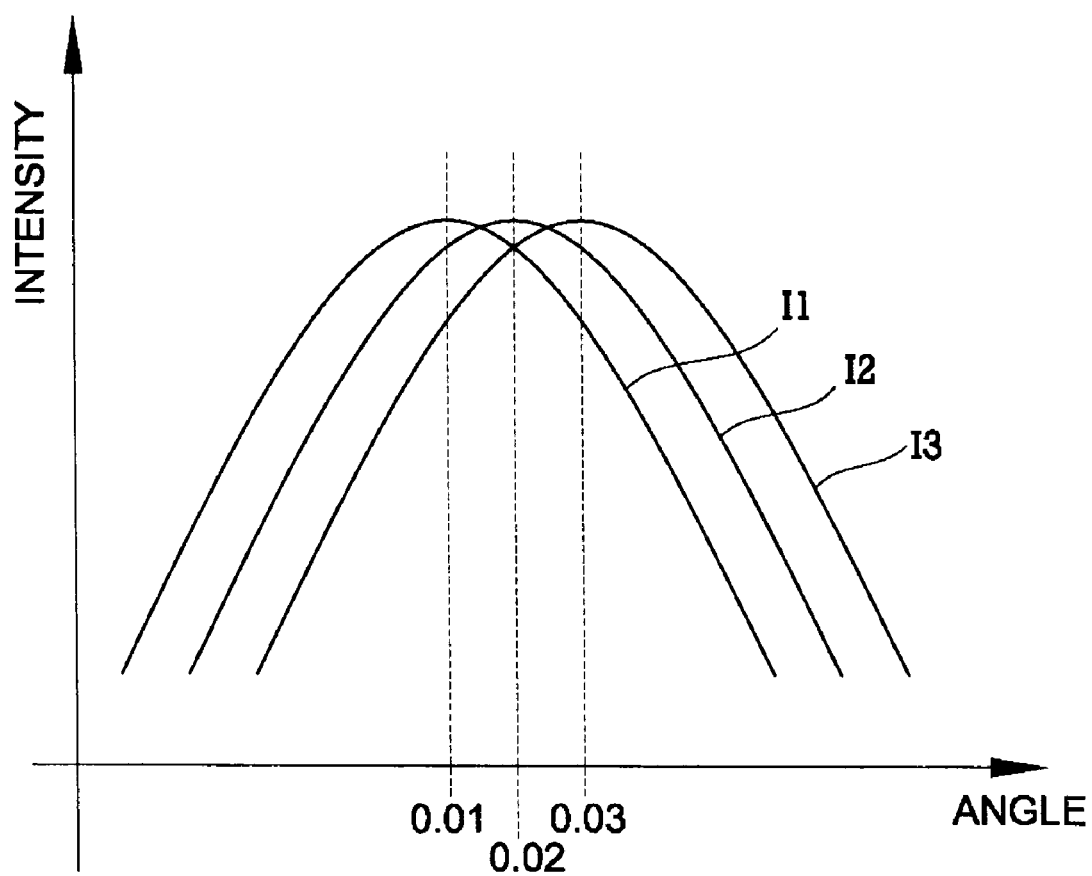

[FIG. 9]
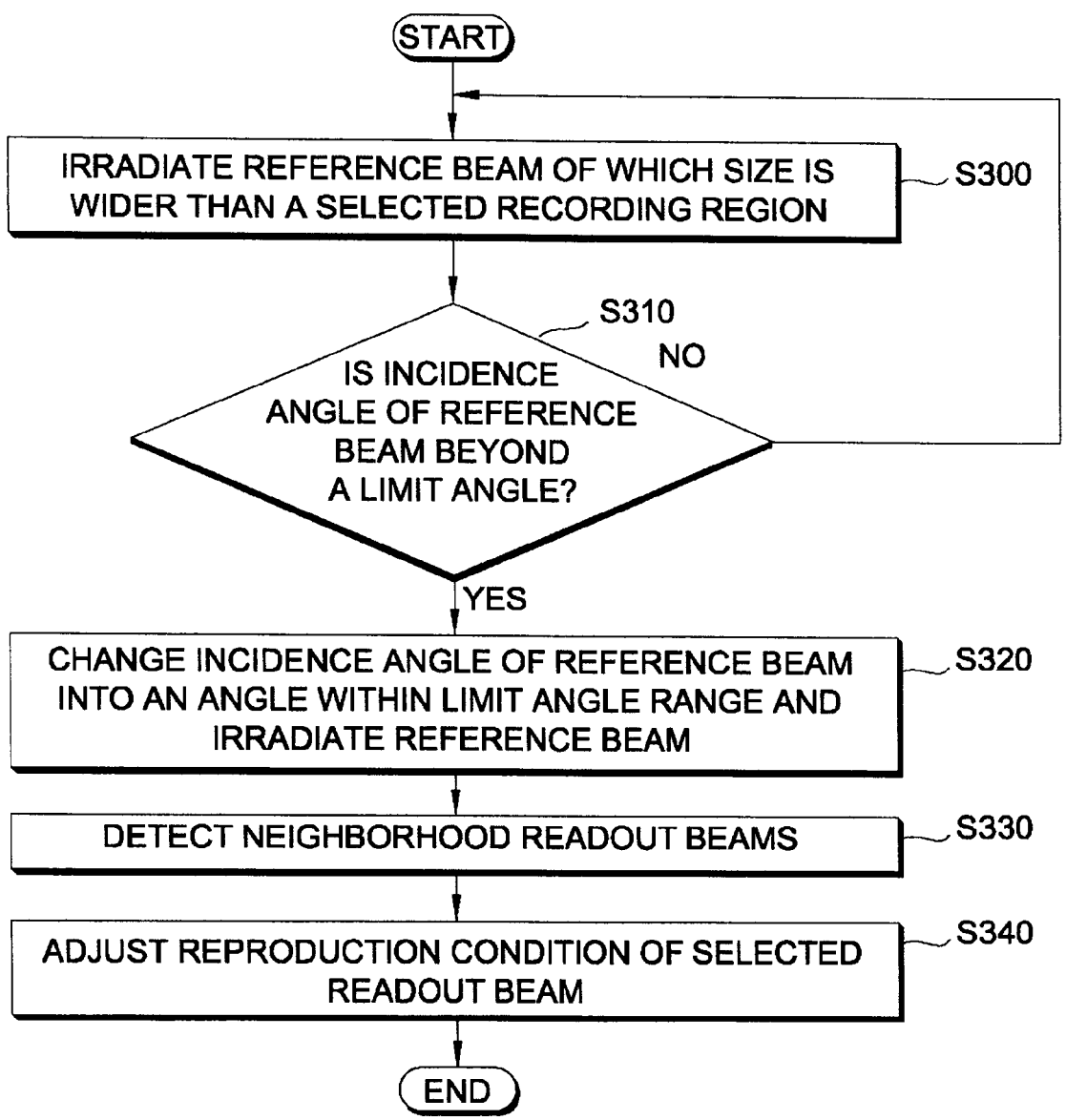

OPTICAL INFORMATION PROCESSING APPARATUS, OPTICAL INFORMATION RECORDING METHOD, OPTICAL INFORMATION REPRODUCING METHOD AND OPTICAL INFORMATION SERVO CONTROLLING METHOD

BACKGROUND

1. Technical Field

The present invention relates to an optical information processing apparatus, an optical information servo controlling method, an optical information recording method, and an optical information reproducing method, and more particularly, to an optical information processing apparatus, an optical information servo controlling method, an optical information recording method, and an optical information reproducing method capable of recording and reproducing optical information at multiplexed angles by using different offset angles corresponding to different tracks, recording and reproducing the optical information by changing an incidence angle of a reference beam beyond a limit angle range into an incidence angle within the limit angle range, and performing servo control by using optical information of neighborhood readout beams reproduced from neighborhood tracks.

2. Related Art

As an example of an optical data processing apparatus, there are DVDs (Digital Versatile Disc), HD-DVDs, BDs (Blue Ray Disc), near field optical processing apparatuses, and holographic optical information processing apparatuses.

The holographic optical information processing apparatus irradiates a reference beam on a recording medium to form interference fringe by intersection of the reference beam and an optically modulated signal beam, so that optical information (or data) is recorded on the recording medium. In order to reproduce the data recorded on the recording medium, only the reference beam is irradiated to the interference fringe on recording medium. A readout beam generated by diffraction of the interference fringe is detected and output, so that the data recorded on the recording medium can be reproduced.

In such a holographic optical information processing apparatus, the reference beam may be irradiated on one beam spot at different angles in a multiplexed manner in order to increase data recording capacity. The multiplexed input data can be output by irradiating only the reference beam at different angles at the time of data reproduction. In other words, the holographic optical information processing apparatus is an large capacity data storage apparatus capable of inputting and outputting multiplexed and overlapped data in one beam spot.

In such a holographic optical information processing apparatus, an optical multiplexing method is used to increase data recording density. As examples of the optical multiplexing method, there are an angular multiplexing method, a phase-code multiplexing method, a wavelength multiplexing method, a shift multiplexing method, and the like. In the angular multiplexing method, the multiplexing is performed by changing an incidence angle of the reference beam. In the phase-code multiplexing method, the multiplexing is performed by spatially modulating phases. In the wavelength multiplexing method, the multiplexing is performed according to a change in wavelength by using a wavelength variable laser. In the shift multiplexing method, the multiplexing is performed by shifting the recording medium.

At the time of reproduction of the multiplexed, recorded optical information, the optical information may be reproduced from neighborhood recording regions as well as the selected recording region. In this case, the optical information reproduced from the non-selected recording regions becomes noise, so that the reproduction efficiency of the optical information reproduced from the selected recording region may deteriorate. In order to solve the problem, techniques for blocking the readout beams reproduced from the non-selected recording regions have been proposed. As an example, one of the techniques is disclosed in International Patent Publication No. WO 2004/102541, titled "High Data Density Volumetric Holographic Data Storage Method And System" by Thomson Licensing Inc. In the Patent Document, the readout beams reproduced from the non-selected recording regions are blocked by using a filter.

On the other hand, servo control is needed in order to accurately reproduce the recorded holographic optical information. A technique therefor is disclosed in US Patent Application Publication No. 2005-0030876, titled "Optical Information Recording Apparatus And Optical Information Reproducing Apparatus" filed by Optware Corporation in Japan. In the Patent Document, a separate laser source for servo control is used.

In the technique disclosed in the Patent Document, since the separate laser source for servo control is used, constructions of optical systems and apparatuses for servo control become complicated. In addition, since the laser source for servo control uses a wavelength different from that of the optical information processing apparatus, constructions of the optical information recording medium or the optical information processing apparatus become more complicated.

SUMMARY

The present invention provides an optical information processing apparatus, an optical information reproducing method, and an optical information servo controlling method capable of detecting adjacent readout beams reproduced from adjacent recording regions of a selected recording region at a time of optical information reproduction and performing a servo control for optical information reproduction without a separate servo control beam.

The present invention also provides an optical information processing apparatus, an optical information reproducing method, and an optical information servo controlling method capable of recording and reproducing optical information at multiplexed angles by using different offset angles corresponding to different tracks and recording and reproducing the optical information by changing an incidence angle of a reference beam beyond a limit angle range into an incidence angle within the limit angle range.

According to an aspect of the present invention, there is provided an optical information processing apparatus comprising: an optical system which irradiates a reference beam on an optical information recording medium having a plurality of recording regions adjacent to each other so that the reference beam is wider than each of the recording regions; a filter which filters readout beams reproduced from the optical information recording medium to pass a selected readout beam reproduced from a selected recording region and separates neighborhood readout beams reproduced from neighborhood of the selected recording regions; a readout beam detector which detects the selected readout beam passing through the filter; a neighborhood readout beam detector which detects the neighborhood readout beams separated by the filter; and a controller which compares the neighborhood readout beams detected by the neighborhood readout beam detector to control a reproduction condition of the selected readout beam.

According to another aspect of the present invention, there is provided an optical information recording method comprising steps of: irradiating a signal beam including optical information on an optical information recording medium; and irradiating a reference beam on the optical information recording medium at multiplexed angles so that the reference beam is irradiated on different tracks at different offset angles.

According to still another aspect of the present invention, there is provided an optical information reproducing method comprising steps of: irradiating a reference beam on a selected recording region of an optical information recording medium having a plurality of recording regions adjacent to each other so that the reference beam is wider than the selected recording region; detecting a plurality of neighborhood readout beams reproduced from neighborhood recording regions of the selected recording region; and comparing the neighborhood readout beams to adjust a reproduction condition of a selected readout beam and detecting the selected readout beam.

According to further still another aspect of the present invention, there is provided an optical information processing apparatus comprising steps of: irradiating a reference beam on a selected recording region of an optical information recording medium having a plurality of recording regions adjacent to each other so that the reference beam is wider than the selected recording region; detecting a plurality of neighborhood readout beams reproduced from neighborhood recording regions of the selected recording region; and comparing the neighborhood readout beams to adjust a reproduction condition of a selected readout beam and detecting the selected readout beam.

BRIEF DESCRIPTION OF THE DRAWINGS

The above and other features and advantages of the present invention will become more apparent by describing in detail exemplary embodiments thereof with reference to the attached drawings in which:

FIG. 1 is a view illustrating a construction of an optical information processing apparatus according to an embodiment of the present invention;

FIG. 2 is a plan view illustrating a beam receiving state of a servo control neighborhood readout beam detector in the optical information processing apparatus according to the embodiment of the present invention;

FIG. 3 is a view illustrating a construction of tracks of an optical information recording medium in the optical information processing apparatus according to the embodiment of the present invention;

FIG. 4 is a view illustrating an overlapped recording state of an optical information recording region recorded on the optical information recording medium;

FIG. 5 is a flowchart illustrating an optical information recording method according to an embodiment of the present invention;

FIG. 6A is a schematic view illustrating an overlap limitation according to an increase in the number of tracks in an optical information recording medium;

FIG. 6B is a schematic view illustrating recording regions formed on the optical information recording medium by changing the angles of reference beams beyond the limit angle into angles within an limit angle range;

FIG. 7 is a flowchart illustrating an optical information reproducing method according to an embodiment of the present invention;

FIG. 8 is a graph illustrating an intensity of a readout beam from a selected track in comparison with intensities of readout beams from neighborhood tracks when optical information is reproduced from the track selected by the optical information processing apparatus according to an embodiment of the present invention; and FIG. 9 is a flowchart illustrating an optical information servo controlling method using FIG. 8.

DESCRIPTION OF EXEMPLARY EMBODIMENTS

Hereinafter, an optical information processing apparatus according to an embodiment of the present invention is described. FIG. 1 is a view illustrating a construction of the optical information processing apparatus according to the embodiment of the present invention. As shown in FIG. 1, the optical information processing apparatus includes a light source 100 and a first beam splitter 110 which splits a beam emitted from the light source 100 into a signal beam and a reference beam.

The first beam splitter 110 is a polarized beam divider which passes an S-polarization signal beam (S wave) in a direction of 90° and passes a P-polarization reference beam (P wave) in the same direction. A rotating mirror 120 is disposed along a path of the reference beam separated by the first beam splitter 110 so as to irradiate the reference beam on an optical information recording medium 210. The rotating mirror 120 may be a Galvano mirror so as to irradiate the reference beam at multiplexed angles.

A reflecting mirror 130 is disposed along a path of the signal beam separated by the first beam splitter 110 so as to guide the signal beam to the optical expander 150. The optical expander 150 expands the signal beam to match with a size of a later-described optical modulator 160, so that data can be loaded on the signal beam. A shutter is disposed between the optical expander 150 and the reflecting mirror 130. When optical information is recorded, the shutter 140 is opened to pass the signal beam. When the optical information is reproduced, the shutter 140 is closed to block the signal beam. Next, the optical modulator 160 is disposed so as to load the data, that is, the optical information. Next to the optical modulator 160, lenses 170a and 170b and a first filter 180 are disposed. The first filter 180 removes spike-type noise from the beam passing through the lens 170a to form a beam having uniform intensity.

Next to the first filter 180, a $\lambda/2$ polarizing plate 190 is disposed to polarize the signal beam into P-polarization beam. The P-polarization beam is Fourier-transformed by a Fourier transformation lens 200, so that the Fourier transformed beam is irradiated on the recording medium 210. The recording medium 210 may be made of a photo polymer. The recording medium 210 may be a disc or a card on which tracks including recording regions are formed. The tracks formed on the recording medium 210 may have a shape of circle, spiral, straight line, or sine curve.

Next to the recording medium 210, two lenses 220a and 220b are disposed to focus a readout beam. A second optical divider 230 and a $\lambda/4$ polarizing plate 240 are disposed between the lenses 220a and 220b. The $\lambda/4$ polarizing plate 240 is used to select a specific polarization. When the P-polarization readout beam reproduced from the recording medium 210 is reflected on the second filter 250, the $\lambda/4$ polarizing plate 240 has a function of converting the returning P-polarization readout beam to an S-polarization beam by the $\lambda/4$ polarizing plate 240.

The lens 220b is disposed next to the second filter 250, and a second Fourier transformation lens 260 is disposed next to the second filter 250. The second filter 250 has a hole 251 at the center thereof so as to pass only the readout beam reproduced from the selected recording region. In addition, the second filter 250 is provided with a reflecting layer 252 on the surface thereof so as to reflect the neighborhood readout beams reproduced from the neighborhood recording regions.

The readout beam reproduced from the selected recording region and passing through the second filter 250 is detected by a readout beam detector 270. The readout beam detector 270 may be an image pickup device having a pixel array such as CCD (Charge Coupled Device) or CMOS (Complementary MOS).

The P-polarization neighborhood readout beam reflected on the reflecting layer of the second filter 250 is converted to an S-polarization neighborhood readout beam by the $\lambda/4$ polarizing plate 240. The S-polarization neighborhood readout beam is directed in a direction of 90° by the second optical divider 230. The neighborhood readout beam is guided to a neighborhood readout beam detector 290 by a lens 280, so that the neighborhood readout beam is detected by the neighborhood readout beam detector 290. The neighborhood readout beam detector 290 may be constructed with a photodiode.

The optical information of the neighborhood readout beam detected by the neighborhood readout beam detector 290 is transmitted to a controller 300. The controller 300 analyzes the optical information of the neighborhood readout beam and controls the rotating angle of the rotating mirror 120 or the tilted state of the optical information recording medium 210.

FIG. 2 is a plan view illustrating a beam receiving state of a servo control neighborhood readout beam detector in the optical information processing apparatus according to the embodiment of the present invention. As shown in FIG. 2, the neighborhood readout beam detector 290 is constructed with two photodiodes 291 and 292. The neighborhood readout beam detector 290 detects an intensity of the neighborhood readout beam and transmits the information on the intensity of the neighborhood readout beam to the controller 300. The controller 300 performs servo control for adjusting the rotating angle of the rotating mirror 120 or the tilted state of the optical information recording medium 210 based on the information on the intensity of the neighborhood readout beam.

In such an optical information processing apparatus according to the embodiment of the present invention, a plurality of recording regions are formed on the optical information recording medium 210 on which the optical information is recorded. FIG. 3 is a view illustrating a construction of tracks of an optical information recording medium in the optical information processing apparatus according to the embodiment of the present invention. As shown in FIG. 3, the optical information recording medium 210 includes a plurality of the tracks, that is, a first track $T_1$, a second track $T_2$, a third track $T_3$, ..., and an n-th track $T_n$ of which diameters are different. Each of the tracks $T_1$ to $T_n$ includes a plurality of the recording regions.

FIG. 4 is a view illustrating an overlapped recording state of the optical information recording region recorded on the optical information recording medium 210. As shown in FIG. 4, adjacent recording regions are partially overlapped with each other. In other word, according to the embodiment, the optical information is recorded in a shifted multiplexing manner. More specifically, first, second, and third recording regions LAYER 1, 2, and 3 included in the first track $T_1$ are partially overlapped with first, second, and third recording regions LAYER 1, 2, and 3 included in the second track $T_2$, respectively. The first, second, and third recording regions LAYER 1, 2, and 3 included in the second track $T_2$ are partially overlapped with first, second, and third recording regions LAYER 1, 2, and 3 included in the third track $T_3$.

In addition, in each of the tracks, the adjacent recording regions are partially overlapped with each other. As a result of the overlap recording, the recording density of the optical information can be increased. In order to use the neighborhood readout beams reproduced from the overlapped neighborhood recording regions as servo control data at the time of reproducing the optical information, the reference beam D is generated to be wider than the size of the recording regions.

Now, an optical information recording method according to an embodiment of the present invention is described. FIG. 5 is a flowchart illustrating the optical information recording method according to the embodiment of the present invention. As shown in FIG. 5, firstly, a signal beam on which data is loaded is irradiated on an optical information recording medium 210 (S100). In order to form a plurality of recording regions on the recording medium 210, a reference beam having different offset angles according to the different tracks is irradiated on the recording medium 210 at multiplexed angles (S110).

When the incidence angle of the reference beam is beyond an incidence limit angle region (S120), the incidence angle of the reference beam is changed into an angle within the limit angle region (S130). The reference beam is irradiated on the recording medium 210 to form the recording region (S140). Detailed description thereof is made with reference to Table 1 and FIGS. 6A and 6B.

TABLE 1

|  | First Track | Second Track | Third Track | ... | 50-th Track | ... | 100-th Track |
|---|---|---|---|---|---|---|---|
| First Recording Region | 0.01° | 0.02° | 0.03° |  | 0.50° |  | 1.00° |
| Second Recording Region | 0.11° | 0.12° | 0.13° |  | 0.60° |  | 1.10° |
| Third Recording Region | 0.21° | 0.22° | 0.23° |  | 0.70° |  | 1.20° |
| Fourth Recording Region | 0.31° | 0.32° | 0.33° |  | 0.80° |  | 1.30° |
| ... |  |  |  |  |  |  |  |
| 11-th Recording Region | 1.01° | 1.02° | 1.03° |  | 1.50° |  | 2.00° |

Table 1 shows an example of the multiplexed angles used in case of generating 11 recording regions on each of the tracks formed on the optical information recording medium. As shown in Table 1, the neighborhood recording regions of the same track are multiplexed in units of 0.1°. The recording regions of the different tracks have different offset angles.

Namely, the recording regions of the first, second, third, and 100-th tracks have an offset angle of 0.01°, 0.02°, 0.03°, and 1.00°, respectively. The difference in the offset angle between the adjacent tracks is 0.01°, which means that the optical information is recorded at the multiplexed angles. The tracks having shortest and longest diameters on the optical information recording medium are dummy tracks having dummy data, where meaningful optical information is not recorded. The dummy tracks are used for the servo control.

As shown in Table 1, the recording regions are formed while the offset angles of the tracks are changed in units of 0.01°. The difference in the offset angle between the tracks may be defined according to an angle selectivity curve. As the difference in the offset angle between the tracks becomes large, the intensity of the readout beam reproduced from the neighborhood track of the selected track becomes small. As the difference in the offset angle between the tracks becomes small, it is difficult to adjust the rotating angle of the rotating mirror. Therefore, it is important to define a suitable difference in the offset angle between the tracks.

However, in case of the optical information recording medium 210 having a plurality of the tracks, although the difference in the offset angle between the tracks is defined to be suitable, there is a limitation to formation of the recording regions in the tracks. Namely, it is difficult to form the recording regions beyond the tracks where actuators and lenses can adjust angles.

FIG. 6A is a schematic view illustrating an overlap limitation according to an increase in the number of tracks in the optical information recording medium. For example, as shown in Table 1, if the limit angle of an angle-adjustable range is 1.50°, the 50-th track has the offset angle of 0.50°, and the first to 11-th recording regions are formed at angles of 0.50°, 0.60°, 0.70°, 0.80°, 0.90°, 1.00°, 1.10°, 1.20°, 1.30°, 1.40°, and 1.50°, respectively.

In each of the first to 50-th tracks, all of the first to 11-th recording regions can be formed. However, due to the limit angle, in the 51-th track, the 11-th recording regions cannot be formed. In other words, in the 51-th track, the first recording region corresponds to 0.51°, and the 11-th recording region corresponds to 1.51°, which is beyond the limit angle of 1.50°.

Due to the limit angle, in each of the 51-th to 60-th tracks, the first to 10-th recording regions can be formed. Similarly, in each of the 61-th to 70-th tracks, the first to 9-th recording regions can be formed. In each of the 71-th to 80-th tracks, the first to 8-th recording regions can be formed. In each of the 81-th to 90-th tracks, the first to 7-th recording regions can be formed. In each of the 91-th to 100-th tracks, the first to 6-th recording regions can be formed.

In order to use all the storage capacity of the recording medium 210, as shown in FIG. 6B, it is important to form additional recording regions by changing the irradiation angle, that is, the incidence angle of the reference beam into angle within the limit angle range. FIG. 6B is a schematic view illustrating the recording regions formed on the optical information recording medium by changing the angles of the reference beam beyond the limit angle into angles within an limit angle range.

In addition, the angles of the reference beams track need to be changed into the angle within the limit angle range so that a difference in intensity of the readout beams between the selected track and the neighborhood track. Therefore, it is preferable that the recording regions in the same track are multiplexed in units of 0.1°, and the recording regions between the adjacent tracks are multiplexed in units of 0.01°.

For example, in the 100-th track, since the first recording region is formed at 1.00°, there is no recording region using the angle within the limit angle range of 0.01° to 0.99°. Therefore, after the first to 6-th recording regions are formed, the 12-th, 13-th, 14-th recording regions and the like are sequentially formed at the angles, 0.09°, 0.08°, 0.07°, and the like, respectively. Accordingly, when the tracks and the recording regions increases, it is possible to further use the storage capacity of the recording medium 210.

FIG. 7 is a flowchart illustrating an optical information reproducing method according to an embodiment of the present invention. As described above with reference to FIG. 4, the size of the reference beam D is expanded so as to be wider that the selected recording region on the optical information recording medium 210 where a plurality of the recording regions are formed. The reference beam D is irradiated on the optical information recording medium 210 at an incidence angle up to the limit angle (S200).

When the incidence angle of the reference beam is beyond the limit angle range (S210), the incidence angle of the reference beam is changed into an angle within the limit angle region (S220). Since the size of the reference beam is wider than the selected recording region, the readout beams are also reproduced from the neighborhood recording region.

The selected readout beam reproduced from the selected recording region and the neighborhood readout beams reproduced from the neighborhood recording regions on the optical information recording medium 210 are transmitted to the a filter 250. The selected readout beam reproduced from the selected recording region passes through a hole 251 of the filter, and neighborhood readout beams are reflected on a reflecting layer 252 formed on a surface of the filter. The reflected neighborhood readout beams are detected by a neighborhood readout beam detector 290 (S230). A reproduction condition of the selected readout beam is controlled based on the optical information included in the neighborhood readout beam (S240). The optical information included in the selected readout beam is detected (S250).

The optical information included in the neighborhood readout beams detected by the neighborhood readout beam detector 290 is described with reference to FIG. 8. FIG. 8 is a graph illustrating an intensity of the selected readout beam from the selected track in comparison with intensities of the readout beams from the neighborhood tracks when the optical information is reproduced from the track selected by the optical information processing apparatus according to the embodiment of the present invention.

When the reference beam of which size is expanded to be wider than the selected recording region is irradiated on the selected recording region of the optical information recording medium, the readout beams are reproduced from the neighborhood recording regions as well as the selected recording region. This is because the adjacent recording regions are recorded to be partially overlapped with each other on the recording medium 210 in order to increase the recording intensity of the optical information.

Since the angle of detecting the maximum intensity of the readout beam reproduced from the selected recording region is different from the angle of the maximum intensities of the readout beams reproduced from the adjacent recording regions, the difference in intensities of the readout beams therebetween can be detected.

In comparison of diffraction efficiencies based on the detected intensities of the readout beams of the tracks, the diffraction efficiencies of the first, second, and third, recording regions of the first, second, and third tracks have the maximum values at the angle of 0.01°, 0.02°, and 0.03°, respectively.

For example, in a case where the optical information of the first recording region formed on the second track is reproduced, when the reference beam is irradiated at the accurate incidence angle of 0.02°, the intensity I2 of the selected readout beam reproduced from the second track is larger than the intensities I1 and I3 of the neighborhood readout beams reproduced from the first and third tracks. In addition, the intensities I1 and I3 of the neighborhood readout beams reproduced from the first and third tracks are relatively equal to each other.

However, the incidence angle is deviated from the accurate incidence angle, a difference in the intensities of the readout beams between the first and third tracks are increased. Due to the difference in intensities of the readout beams between the neighborhood tracks, the tilted state and the contacted state of the optical information recording medium as well as the incidence angle can be influenced.

Therefore, a controller 300 analyzes the optical information of the readout beams reproduced from the first and third tracks and adjusts the incidence angle based on the optical information of the neighborhood readout beams. As a result, it is possible to detect the optical information of the selected readout beam reproduced from the second track, that is, the selected track.

FIG. 9 is a flowchart illustrating an optical information servo controlling method using FIG. 8.

Firstly, a reference beam of which size is wider than the selected recording region is irradiated up to an incidence limit angle on the optical information recording medium 210 on which a plurality of adjacent recording regions are formed (S300). When the incidence angle of the reference beam is beyond the incidence limit angle range (S310), the incidence angle of the reference beam is changed into an angle within the limit angle region (S320).

Since the size of the reference beam is wider than the selected recording region, the readout beams are also reproduced from the neighborhood recording regions. The selected readout beam reproduced from the selected recording region and the neighborhood readout beams reproduced from the neighborhood recording regions on the optical information recording medium 210 are transmitted to the a filter 250. The selected readout beam reproduced from the selected recording region passes through a hole 251 of the filter, and neighborhood readout beams are reflected on a reflecting layer 252 formed on a surface of the filter. The size of the hole 251 is designed so as to pass only the selected readout beam reproduced from the selected one recording medium. Therefore, the selected readout beam of the selected recording region can pass that the hole 251 of the filter. However, the neighborhood readout beams of the neighborhood regions cannot pass the hole 251 of the filter, but the neighborhood readout beams are reflected on the reflecting layer 252 formed on a surface of the filter.

The neighborhood readout beams are detected by a neighborhood readout beam detector (S330), and the optical information of the neighborhood readout beams are used for servo control. The servo control is performed based on a difference in intensities of the neighborhood readout beams between the neighborhood recording regions (S340).

The optical information processing apparatus, the optical information recording method, the optical information reproducing method, and the optical information servo controlling method according to the present invention may be modified by the ordinarily skilled in the art in various manners that some components or steps of the apparatus and methods are modified. For example, instead of the separate reflecting layer formed on the filter, a light receiving device may be disposed to the filter so as to detect the intensities of the neighborhood readout beams. In addition, three or more light receiving devices are disposed so as to detect the intensities of the neighborhood readout beams at three or more positions, so that more accurate servo control can be performed. However, it can be underscored by the ordinarily skilled that these modifications including the requisite components of the present invention do not depart from the scope of the present invention.

According to an optical information processing apparatus, an optical information recording method, an optical information reproducing method, and an optical information servo controlling method, since recording regions are partially overlapped with each other, it is possible to increase a recording density of optical information. In addition, since neighborhood readout beams reproduced from neighborhood recording regions of a selected recording region is used for servo control, it is possible to simplify a construction of the optical information processing apparatus. In addition, since an incidence angle of a reference beam beyond a limit angle range is changed into an incidence angle within the limit angle range, it is possible to increase storage efficiency of the optical information recording medium.

What is claimed is:

1. An optical information processing apparatus comprising:
    an optical system which irradiates a reference beam on an optical information recording medium having a plurality of recording regions adjacent to each other so that the reference beam is wider than each of the recording regions;
    a filter which filters readout beams reproduced from the optical information recording medium to pass a selected readout beam reproduced from a selected recording region and separates neighborhood readout beams reproduced from neighborhood of the selected recording regions;
    a readout beam detector which detects the selected readout beam passing through the filter;
    a neighborhood readout beam detector which detects the neighborhood readout beams separated by the filter; and
    a controller which compares the neighborhood readout beams detected by the neighborhood readout beam detector to control a reproduction condition of the selected readout beam, wherein the reproduction condition is one of an incidence angle of the reference beam and a tilted state of the optical information recording medium.

2. The optical information processing apparatus according to claim 1, wherein a reflecting layer is formed on a surface of the filter on which the neighborhood readout beams are irradiated so as to reflect the neighborhood readout beams.

3. The optical information processing apparatus according to 2, wherein a wavelength plate is disposed between the optical information recording medium and the filter so as to change a polarization direction of the readout beams, and wherein a polarized beam splitter is disposed between the wavelength plate and the optical information recording medium so as to direct the neighborhood readout beam reflected on the filter to the neighborhood readout beam detector.

4. The optical information processing apparatus according to claim 1, wherein a plurality of tracks are constructed with the recording regions, and wherein the reference beam is irradiated at multiplexed angles so that the reference beam is irradiated on the different tracks at different offset angles.

5. The optical information processing apparatus according to claim 4, wherein the tracks have a shape of circle, spiral, straight line, or sine curve.

6. The optical information processing apparatus according to claim 1, wherein the optical information recording medium is constructed with a disc or a card.

7. The optical information processing apparatus according to claim 4, wherein the recording regions adjacent to each other in one of the tracks are partially overlapped with each other, and wherein the recording regions adjacent to each other between the tracks are partially overlapped with each other.

8. The optical information processing apparatus according to claim 4, wherein the selected readout beam is detected from the tracks excluding a starting track and an ending track.

9. An optical information recording method comprising steps of:
irradiating a signal beam including optical information on an optical information recording medium;
irradiating a reference beam on the optical information recording medium at multiplexed angles so that the reference beam is irradiated on different tracks at different offset angles; and
changing an incidence angle of the reference beam which is irradiated at the incidence angle beyond an incidence limit angle into an angle within the limit angle range so as to form the recording regions.

10. The optical information recording method according to claim 9, wherein the recording regions adjacent to each other in one of the tracks are partially overlapped with each other, and wherein the recording regions adjacent to each other between the tracks are partially overlapped with each other.

11. The optical information recording method according to claim 9, wherein starting and ending tracks of the tracks are dummy tracks on which data used for only diffraction and reproduction of beams are recorded.

12. The optical information recording method according to claim 9, wherein the reference beam is irradiated as the multiplexed angles and the offset angle are changed in the ascending order.

13. The optical information recording method according to claim 9, wherein, when the incidence angle of the reference beam beyond the limit angle is changed into the incidence angle within the limit angle range, the incidence angle of the reference beam is changed from a high angle to a low angle.

14. An optical information reproducing method comprising steps of:
irradiating a reference beam on a selected recording region of an optical information recording medium having a plurality of recording regions adjacent to each other so that the reference beam is wider than the selected recording region, wherein the reference beam on the recording region irradiated at an incidence angle up to an incidence limit angle, wherein the incidence angle beyond the limit angle is changed into an incidence angle within a limit angle range;
detecting a plurality of neighborhood readout beams reproduced from neighborhood recording regions of the selected recording region; and
comparing the neighborhood readout beams to adjust a reproduction condition of a selected readout beam and detecting the selected readout beam.

15. The optical information reproducing method according to claim 14, wherein the reproduction condition is one of an incidence angle of the reference beam and a tilted state of the optical information recording medium.

16. The optical information reproducing method according to claim 14, wherein a plurality of tracks are constructed with the recording regions, and wherein the reference beam is irradiated at multiplexed angles so that the reference beam is irradiated on the different tracks at different offset angles.

17. The optical information reproducing method according to claim 16, wherein the recording regions adjacent to each other in one of the tracks are partially overlapped with each other, and wherein the recording regions adjacent to each other between the tracks are partially overlapped with each other.

18. The optical information reproducing method according to claim 14, wherein the selected readout beam is detected from the tracks excluding a starting track and an ending track of the optical information recording medium.

19. An optical information servo controlling method comprising steps of:
irradiating a reference beam on a selected recording region of an optical information recording medium having a plurality of recording regions adjacent to each other so that the reference beam is wider than the selected recording region;
detecting a plurality of neighborhood readout beams reproduced from neighborhood recording regions of the selected recording region; and
comparing the neighborhood readout beams to adjust a reproduction condition of a selected readout beam and detecting the selected readout beam, wherein the reproduction condition is one of an incidence angle of the reference beam and a tilted state of the optical information recording medium.

20. The optical information servo controlling method according to claim 19, wherein the step of detecting a plurality of the neighborhood readout beams comprises steps of:
changing polarization directions of the neighborhood readout beams;
reflecting the neighborhood readout beams in a direction opposite to a propagation direction of the neighborhood readout beams;
change paths of the reflected neighborhood readout beams; and
detecting intensities of the neighborhood readout beams of which paths are changed.

21. The optical information servo controlling method according to claim 19, further comprising a step of irradiating the reference beam on the recording region at an incidence angle up to an incidence limit angle, wherein the incidence angle beyond the limit angle is changed into an incidence angle within a limit angle range.

* * * * *